United States Patent
Kärkkäinen et al.

(10) Patent No.: US 7,254,717 B2
(45) Date of Patent: Aug. 7, 2007

(54) METHOD AND ARRANGEMENT FOR PROTECTING INFORMATION

(75) Inventors: Tero Kärkkäinen, Tampere (FI); Tommi Kivimäki, Nokia (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 10/641,287

(22) Filed: Aug. 15, 2003

(65) Prior Publication Data
US 2004/0252575 A1 Dec. 16, 2004

Related U.S. Application Data

(63) Continuation of application No. PCT/FI01/00146, filed on Feb. 15, 2001.

(51) Int. Cl.
*G06F 12/14* (2006.01)
*G06F 12/16* (2006.01)

(52) U.S. Cl. .................. 713/193; 711/163; 711/164

(58) Field of Classification Search ............... 713/189, 713/193; 711/163, 164
See application file for complete search history.

(56) References Cited

U.S. PATENT DOCUMENTS 5,563,945 A * 10/1996 Gercekci .................. 713/190
5,771,287 A * 6/1998 Gilley et al. ............... 713/191
5,825,878 A * 10/1998 Takahashi et al. .......... 713/190
5,943,283 A 8/1999 Wong et al.
6,285,870 B1 9/2001 Lorieau
6,832,316 B1 * 12/2004 Sibert ....................... 713/181
7,005,733 B2 * 2/2006 Kommerling et al. ...... 257/679
2005/0005149 A1 * 1/2005 Hirota et al. ............... 713/193

FOREIGN PATENT DOCUMENTS

DE 199 22 155 A1 11/2000
EP 0 660 215 A2 6/1995

* cited by examiner

*Primary Examiner*—Matthew Smithers
(74) *Attorney, Agent, or Firm*—Squire, Sanders & Dempsey L.L.P.

(57) ABSTRACT

An arrangement for protecting data saved in a memory, in which arrangement at least one memory element and at least one data processing element are combined by means of required interfaces into a data processing entity. The arrangement comprises at least one scrambler (300, 410, 600) connected to the data processing entity, which scrambler (300, 410, 600) scrambles the form in which the data to be saved in the memory element is represented and/or descrambles data saved in the memory element into plain text when data is taken from the memory element for the use of the data processing elements.

36 Claims, 5 Drawing Sheets

METHOD AND ARRANGEMENT FOR PROTECTING INFORMATION

This application is a continuation of international application PCT/FI01/00146 filed 15 Feb. 2001 which designated the US and was published under PCT article 21(2) in English.

BACKGROUND OF THE INVENTION

1. Field of the Invention

The invention relates to a method and an arrangement for protecting information in a memory element.

2. Description of the Related Art

Many modern electronic devices, such as mobile telephones and microcomputers, contain integrated circuits that are also called microcircuits. These integrated circuits have enabled a significant increase in the performance of electronic devices during the recent years and decades. More and more components are compressed in integrated circuits, which enables an increase in the memory and data processing capacity. The continuous increase in the integration degree is mainly due to the diminished size of the components used in the microcircuits brought about by the advancement in manufacturing technology. Further, when the size of the electronic devices diminish, the integration degree of the microcircuits must be increased, in other words the number of components to be positioned in the same package must be increased. The intention can even be to integrate a whole functioning data processing system, for instance the central functions of a mobile phone, on the same chip. For the reasons of cost-effectiveness, the intention is to use as many prefabricated components as possible and to avoid client-specific components.

Electronic devices frequently have at least one, but usually more memory elements, in which data relevant for the function has been saved. This data is essential from the point of view of illegal copying, i.e. piracy, so that its protection for instance by encrypting is very important for the legal manufacturer of the device.

Further, if several ASIC (Application Specific Integrated Circuit) components are to be positioned in one microcircuit package along with memory elements, the central processing unit, i.e. the CPU, and other data processing elements, the protection of the data is problematic, because the protection must not disturb the internal functioning of the microcircuit, but it must provide sufficient protection against illegal copying of data.

SUMMARY OF THE INVENTION

An object of the invention is to implement an improved method of protecting data saved in the memory elements of a microcircuit or an integrated circuit.

According to another aspect of the invention, there is provided a method of protecting data saved in a memory, in which method at least one memory element and at least one data processing element are combined by means of required interfaces into a data processing entity, the method comprising: scrambling the form in which the data to be saved in the memory element is represented by means of at least one scrambler connected to the data processing entity; descrambling data saved in the memory element by means of at least one scrambler connected to the data processing entity into plain text when data is taken from the memory element for the use of data processing elements.

According to another aspect of the invention, there is provided an arrangement for protecting data saved in a memory, in which arrangement at least one memory element and at least one data processing element are combined by means of required interfaces into a data processing entity, the arrangement comprising: at least one scrambler connected to the data processing entity, which scrambler scrambles the form in which the data to be saved in the memory element is represented or which scrambler descrambles data saved in the memory element into plain text when data is taken from the memory element for the use of the data processing elements.

According to another aspect of the invention, there is provided an arrangement for protecting data saved in a memory, in which arrangement at least one memory element and at least one data processing element are combined by means of required interfaces into a data processing entity, the arrangement comprising:at least one scrambler connected to the data processing entity, which scrambler scrambles the form in which the data to be saved in the memory element is represented and which scrambler descrambles data saved in the memory element into plain text when data is taken from the memory element for the use of the data processing elements.

According to another aspect of the invention, there is provided an arrangement for protecting data saved in a memory, in which arrangement at least one memory element and at least one data processing element are combined by means of required interfaces into a data processing entity, the arrangement is configured to: scramble connected to the data processing entity, which scrambler scrambles the form in which the data to be saved in the memory element is represented; descramble data saved in the memory element into plain text when data is taken from the memory element for the use of the data processing elements.

Further embodiments of the invention are disclosed in the dependent claims.

The invention is based on positioning one or more scramblers in the same package or on the same semiconductor chip as the memory element or on a different printed board than the memory element for protecting the data saved in the memory element, which scramblers scramble the form in which the data to be saved in the memory is represented and/or re-decompresses data into plain text for the use of a data-processing element when required. The data to be protected is always in a protected format in the memory element. The scrambler is arranged on buses preferably in such a way that it is transparent from the point of view of the data processing entity.

A plurality of advantages is achieved with the method and arrangement according to the invention. With the method according to the invention, data saved in memory circuits can be protected for instance against illegal copying. Further, since the protection of the memory is not in the actual memory element, prefabricated memories on the market can be used when possible, whereby particularly the requirement for cost-effectiveness important from the point of view of the mass production is easier to meet. The provided solution also allows the user of the device to protect saved data of his/her own; for example a telecommunications operator can protect call data.

BRIEF DESCRIPTION OF THE DRAWINGS

The invention will now be described in more detail in connection with preferred embodiments, with reference to the attached drawings, in which.

DETAILED DESCRIPTION OF THE PREFERRED EMBODIMENTS

The method according to the invention is suitable to be used in protecting data saved in a memory element, typically by encrypting with different methods, in all electronic devices, such as mobile phones, base stations, handheld computers or other microcomputers. The method and the arrangement implementing the method can be applied to electronic devices of all sizes, but they are particularly applicable to small and light-weighted devices, which typically include many kinds of products within consumer electronics.

Figure 1:
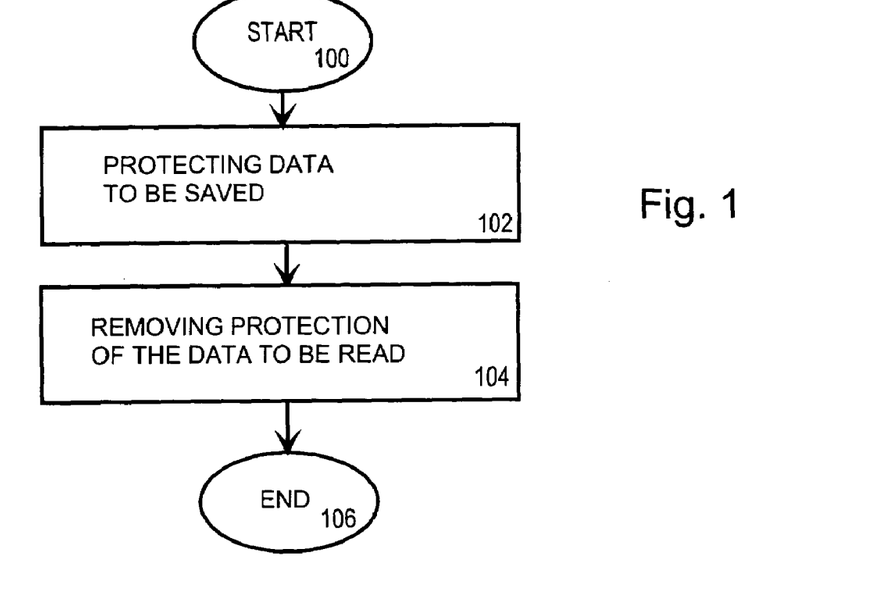
FIG. 1 shows the method steps for protecting data saved in a memory element.

Next, a method of protecting a memory is described by means of the flowchart of FIG. 1. The method can be applied to the protection of data in a memory element positioned in the same package or on the same chip as one or more data processing elements, such as a central processing unit, i.e. CPU, or an ASIC component, for example, in other words to the protection of data in an internal memory unit. The method can also be applied to the protection of an external memory element. The method can be applied to the protection of both different user data and commands. The performance of the method starts in block 100. In block 102, the form in which the data to be saved in the memory element is represented is scrambled by means of at least one scrambler. The scrambler can be positioned in the same package or on the same semiconductor chip as one or more memory elements or data processing elements. The scrambler can also be positioned on a different printed board than the memory element to be protected. The scrambler is arranged on buses preferably in such a way that it is a transparent element from the point of view of the data processing entity. The data-protecting scrambler is preferably implemented by means of an interleaver, encoder or encryption algorithm. Typically, the data in bit format is thus saved in the memory element in such a format that the bits are in an incorrect order and the data in the memory is displayed to the possible reader in an unintelligible format.

Further, the scrambler typically comprises a bus adapter element for adapting the telecommunication to be transmitted for to bus used in each particular case. The bus adapter can preferably be implemented with such an adapter element that adapts the telecommunication to be transmitted to the bus protocol for instance by changing the size of the data transmission frame or data transmission rate. The bus adapter can also be implemented with a bus adapter element which, when required, only delays the data attempting to get on the bus to synchronize the timings.

In block 104, the conversion of the form in which the data saved in the memory element is represented is removed when data is taken from the memory element for the use of data processing elements. Thus, the data in an encrypted format in the memory element is preferably returned into plain text in real time as far as possible. The scrambler removing protection is typically implemented by means of a decoder, de-interleaver or an encryption algorithm. Thus the data is, when desired, always saved in an encrypted format.

It is to be noted that the scrambler is preferably implemented in such a way that both the protection of the data and the removal of the protection are performed with the same scrambler. Thus, the scrambler is preferably implemented with an encoder/decoder pair, an interleaver/de-interleaver pair or an encryption algorithm.

The performance of the method ends in block 106.

It is to be noted that the scrambler can be adapted as a master-slave type or as a slave-only type depending on the operating environment of the system. The scrambler adapted for master-slave type traffic can be adapted both for a system having an external master and for a system having an internal master.

In the method, the memory element can be divided into an area the data of which is protected, an area the data of which is not protected, and an area to the data of which there is no access. Also, different protection methods can be used for different areas of the memory element. The division of the memory element is implemented by means of addresses and one or more configuration registers.

Figure 2:
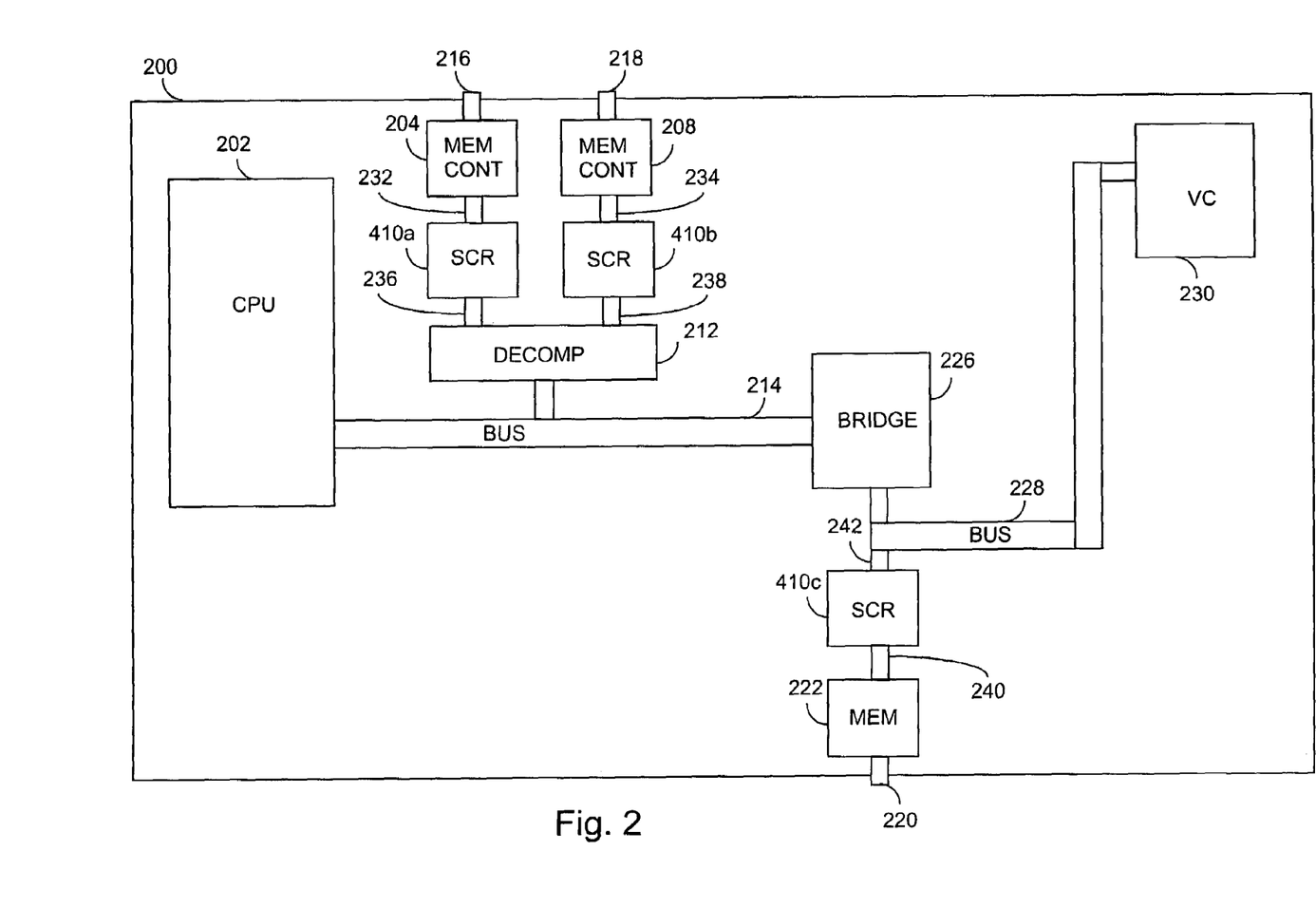
FIG. 2 shows one example of the positioning of a scrambler.

FIG. 2 shows, for the sake of clarity, one simplified example of a data processing entity to be positioned on one chip or in one package 200 (system-on-chip). It is self-evident for a person skilled in the art that the data processing entity can also comprise other parts than those shown in FIG. 2. Block 202 is a central processing unit (CPU). Blocks 204, 208 are memory controllers that typically control external memories. The memories can also be internal. The memory element and memory controller can be integrated on the same chip; thus they can be both external and internal. The memory control can also be connected to an ASIC component, for example. The external memories of the memory controllers 204, 208 are not shown in FIG. 2.

Data to be saved has been encrypted in scramblers 410a and 410b. The scrambler can preferably be placed between the memory element or memory controller and a bus transmitting data to at least one data processing element. Thus, buses 232, 234, 240 are needed between the memory elements or memory blocks, and buses 236, 238, 242 on the bus transmitting data from the scrambler to the rest of the system. The memory elements can be either read-only memories or read and write memories. The data of the memory elements or a part of it is protected against illegal reading of the memories. The memories can be read through interfaces 216, 218 or by detaching the memory elements from their package. The figure also shows a decompression block 212, which is used for decompressing compressed data. The data saved on the processor bus 214 is in plain text.

Block 226 is an element connecting different buses, typically called a bridge. In other words, the bridge 226 connects the buses 214 and 228. If required, the bridge 226 can also comprise a scrambler.

The memory elements used by client-specific data processing elements, such as ASIC components, can be protected with a scrambler. Such a scrambler is a block 410c of FIG. 2, which protects the data saved in the memory element 222 of the ASIC component 230 against illegal reading. The interface 220 can be used to read the memory element 222. The block 222 can also be a memory controller, which typically controls an external memory. Thus, an external memory can be connected to the interface 220. In this case, too, the memories can be internal, the memory element and memory controller can be integrated on the same chip, whereby they can be both external and internal, or the memory control can also be connected to the ASIC component, for instance.

The following describes a few examples of the structure of a scrambler or the scrambler being in connection with its operating environment. It is obvious to a person skilled in the art that scramblers can also comprise blocks and buses other than those shown in the examples, depending on the application. Scramblers are applicable to both situations where data to be saved is not protected and situations where data is protected in different ways. Scramblers support both master and slave operations in their interfaces towards both the bus and the memory element. Scramblers preferably function bidirectionally, in other words they both protect data to be saved in the memory and remove protection of the data to be read from the memory. Scramblers can, however, be designed unidirectional, in other words either to protect or to remove protection.

Figure 3:
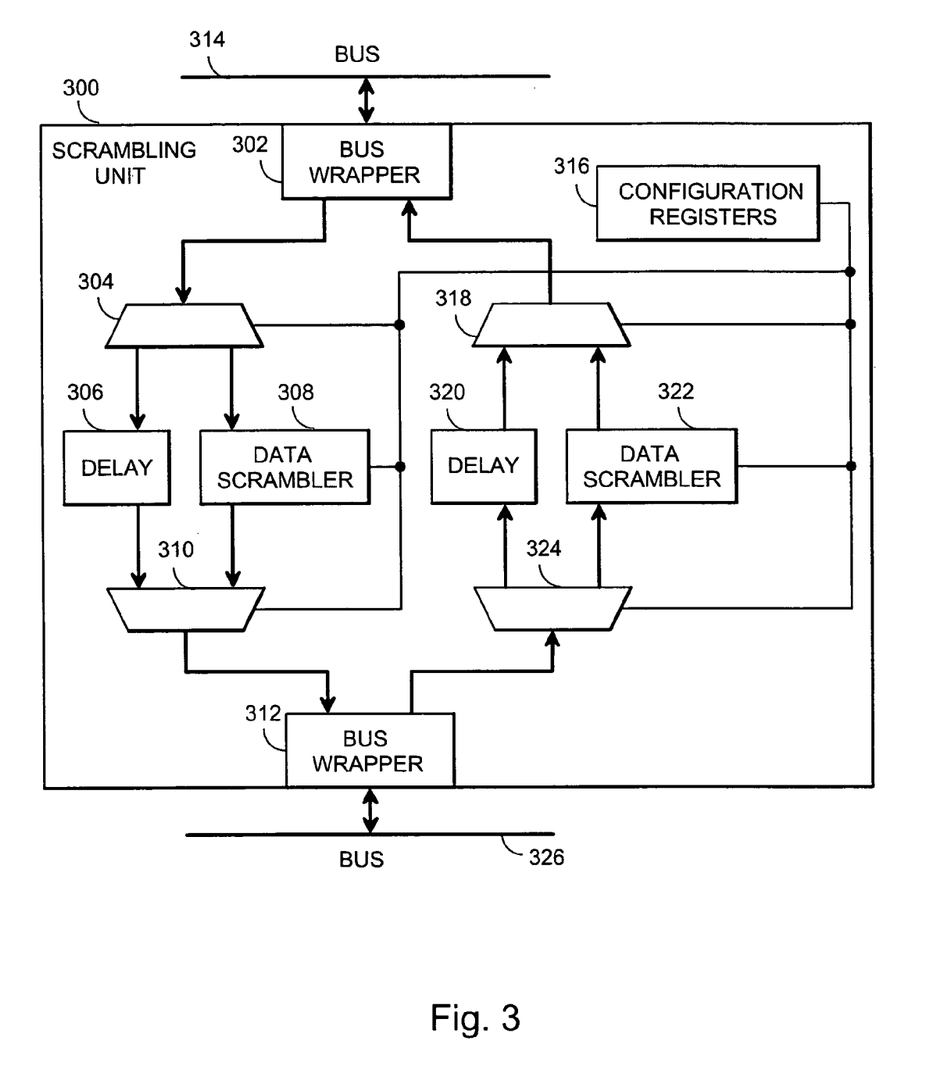
FIG. 3 shows one example of the structure of a scrambler.

FIG. 3 shows one example of the structure of a scrambler. A scrambler 300 functions bi-directionally: it encrypts data to be saved in the memory and decrypts data intended for the use of the data processing element. Blocks 302 and 312 are bus adapter elements, which in this case adapt data from the protocols of buses 314 and 326 to the protocol of the scrambler 300, and also in the other direction from the scrambler 300 to the buses 314 and 326. Such bus adapter elements are frequently called 'wrappers'.

In the scrambler, the actual conversion or encryption of data is performed with a scrambling element 308, which is typically implemented with an encoder and decoder, with an interleaver and de-interleaver or with an encryption algorithm, which can be for instance a commercial algorithm. Since there is no need to protect all data at all times, the scrambler also comprises a bus that passes by the scrambling element. On this bus, a delay element 306 is positioned which adds the same amount of delay to the data stream as is brought about in the scrambling element. The scrambler also comprises multiplexers 304, 310 that separate and combine the protected and unprotected dataflow. The scrambler can also comprise one or more configuration registers 316, which attend to the implementation of the data protection in a desired way, for example maintain an address book by means of which the protection form of the data saved in different areas of the memory element is controlled. The scrambler can also use an external configuration register. As mentioned above, the scrambler in FIG. 3 also comprises a descrambling structure which is used to decrypt data intended for the use of the data processing element. The descrambling structure is depicted by reference numbers 318, 320, 322 and 324.

Figures 4, 7:
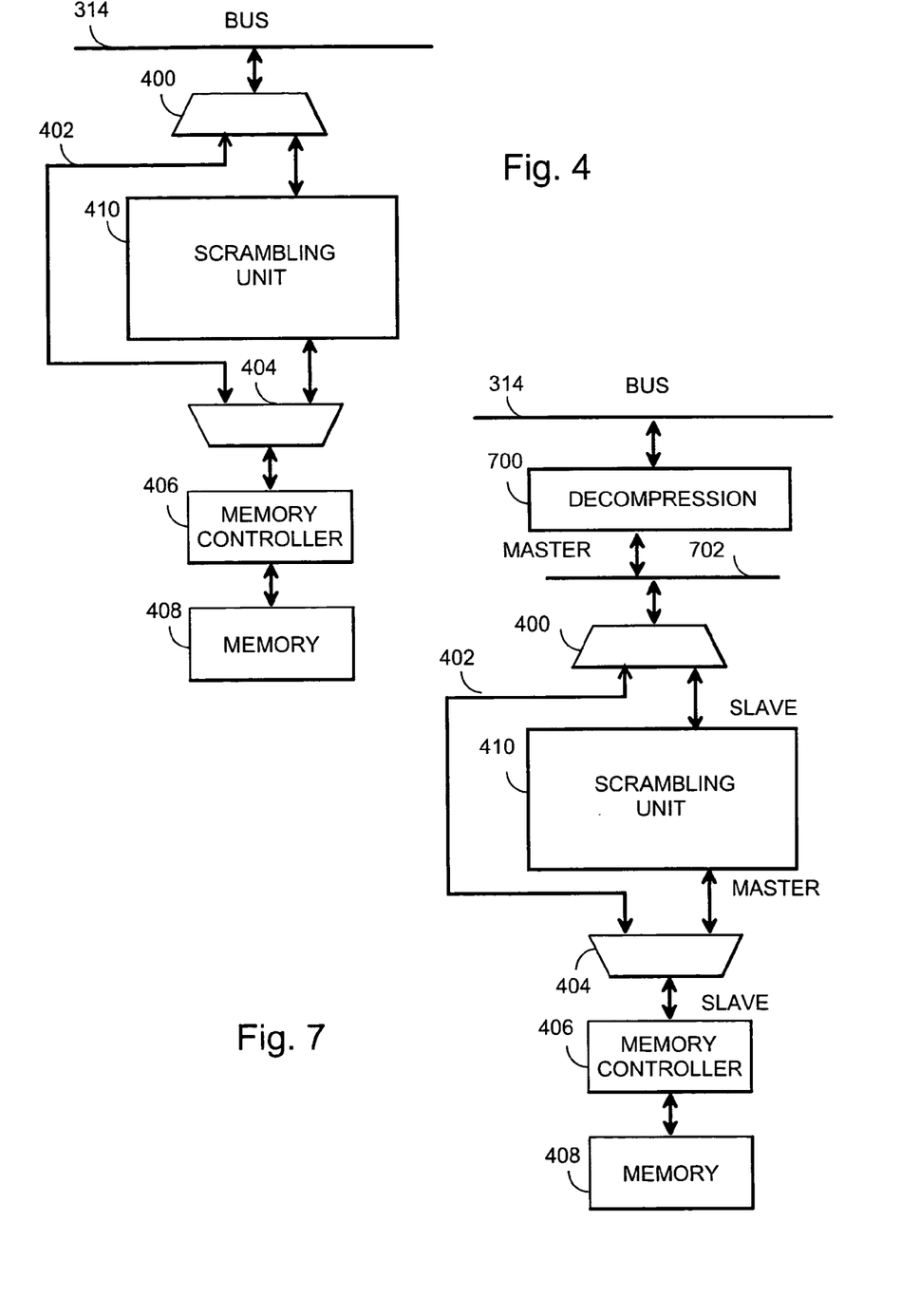
FIG. 4 shows one example of the connection of the scrambler to the memory control element and the memory.
FIG. 7 shows one example of the connection of the scrambler to a data transmission bus when the data on the bus is in a compressed format.

FIG. 4 shows one example of a scrambler that is connected to a memory control element. The structure of the scrambler 410 shown in FIG. 4 is similar to the scrambler 300 shown in FIG. 3 or the scrambler 600 shown in FIG. 6. The scrambler 410 is connected to the bus 314 through a multiplexer 400, because the scrambler 410 can be passed by by means of a bus 402, when required. Passing by the scrambler provides the advantage that the dataflow is not unduly delayed if the data is such that it does not have to be protected; the protection typically causes a delay of at least one clock cycle in the dataflow. If the protection of data is not needed, the use of external passing provides the advantage, compared with internal passing, that the bus cycles are not increased. The bus 314 can be a processor local bus, for instance. The scrambler is also connected to a memory controller 406 by means of a multiplexer 404. The dataflow between the scrambler and the memory controller is continuous, when required, because no other data processing elements or memories are connected to the same bus. The scrambler corresponds to the calls of the bus 314 on behalf of the memory controller. In the example shown in FIG. 4, the memory controller typically functions as a slave for the bus 314 and as a master for the memory element. The memory controller element 406, in turn, is connected to the memory element 408.

Figure 5:
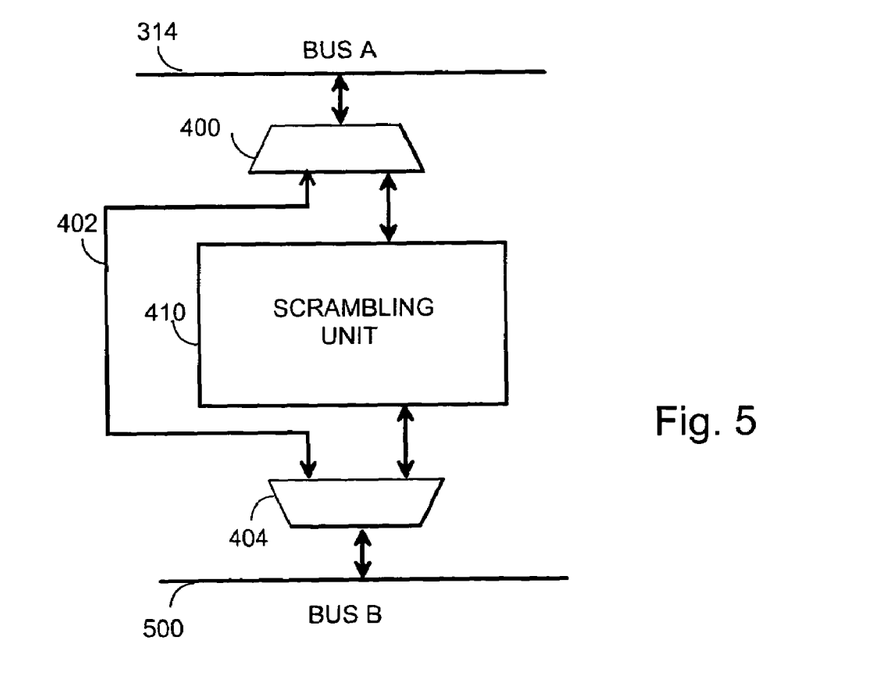
FIG. 5 shows one example of the connection of the scrambler to two different data transmission buses.

FIG. 5 illustrates one example of connecting a scrambler to two different data transmission buses. The structure of the scrambler 410 shown in FIG. 5 is similar to the scrambler 300 shown in FIG. 3 or the scrambler 600 shown in FIG. 6. The bus 314 is, for instance, a processor local bus and bus 500 is, for instance, a second processor bus, which is either an internal bus positioned on a single chip or in a single package, or an external bus. Thus, other data processing elements and memories can also be connected to the bus 500, whereby the dataflow must possibly wait for the access to the bus. The scrambler 410 must, depending on the need, function either as a master or as a slave.

If the second processor bus 500 is external, the possible information security problems are attended to by defining one or more memory areas of the memory element protected with an internal scrambler to be such that there is no access thereto from this bus or that the scrambler encrypts the data thereof. Another situation causing security problems can be such that an external master writes data to an external memory through the scrambler. Thus, the scrambler does not encrypt the data.

Figure 6:
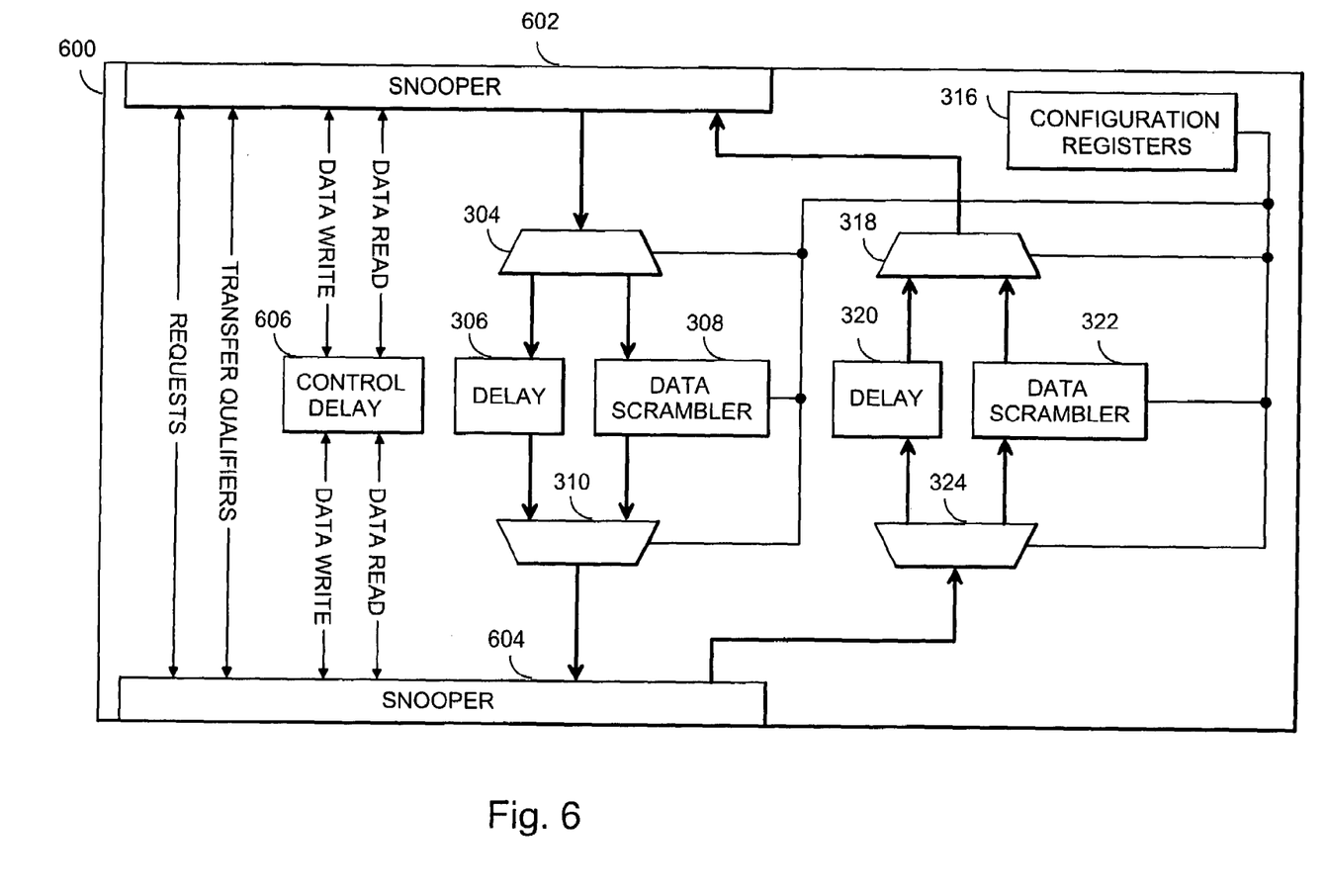
FIG. 6 shows a second example of the structure of a scrambler.

Next, a second solution for the structure of a scrambler is described by means of the example shown in FIG. 6. In FIG. 6, the scrambler 600 is connected to the bus with a bus adapter element 602, 604, which monitors the traffic of the bus. Such a bus adapter element, often called a 'snooper', admits the bus requests through and delays the allowance of a bus resource when required. Such a bus adapter element is applicable to use particularly when non-address pipelining is applied to the data transmission. The allowance of the bus resource must be delayed when required, because the scrambling of data increases the delay to the data signal. A snooper bus adapter element is suitable for connecting a scrambler both between a bus and a memory in accordance with what is shown FIG. 4, for example, and between two buses in accordance with FIG. 5 or FIG. 7, for example. Also the bus adapter element of a snooper type can be passed by if there is no need to protect data. The block 606 is a delay element.

Also the scrambler of FIG. 6 function preferably bi-directionally, in other words it both protects data to be saved in the memory and remove protection of the data to be read from the memory.

The blocks 306, 308, 318, 320, 322 and 324 are explained in the description of the FIG. 6.

FIG. 7 illustrates the connection of a scrambler to a bus in which the data to be transferred is compressed. The compression of a code is used to save memory space. The compressed data must be decompressed into a readable format for the use. The decompression of the compressed data must be performed as efficiently and rapidly as possible so as not to cause an undue delay in the operation of the data processing element, such as a processor. The scrambler and decompressor 700 must be well adjusted together since the scrambler causes more delay between the bus and the memory element. The decompressor is preferably of a type that reads a plurality of series-mode commands during one fetch cycle, which reduces the delay brought about. Typically, the part of the data processing system according to FIG. 7 functions as follows: the memory controller 406 distributes the protected and compressed data stream to the scrambler 410. The scrambler transfers the plain text and compressed data stream to the decompressor 700. In accordance with FIG. 7, there can be a bus extension 702 between the decompressor 700 and the multiplexer 400. After the decompressor, the data stream is in plain text and in a decompressed format that can be taken to a processor, for instance. The structure of the scrambler 410 can be for instance similar to the scrambler 300 shown in FIG. 3 or the scrambler 600 shown in FIG. 6. The scrambler 410 must be able to function either as a master or as a slave, depending on its operating environment.

The scrambler is preferably implemented by software, whereby the functions according to the protection method described are implemented as software functioning in one or more microprocessors. The scrambler can also be implemented for instance with apparatus solutions providing the required functionality, for instance as the ASIC (Application Specific Integrated Circuit) or with utilizing different logic components.

Although the invention has been described above with reference to the example of the attached drawings, it is obvious that the invention is not confined thereto but can be modified in a plurality of ways within the inventive idea of the attached claims.

We claim:

1. A method of protecting data saved in a memory, the method comprising:
    combining at least one memory element and at least one data processing element by means of required interfaces into a data processing entity;
    scrambling a form in which the data to be saved in the memory element is represented by means of at least one scrambler connected to the data processing entity, in such a way that data to be saved in different areas of the memory element is protected in different ways and the division of the memory element is implemented by using a configuration resister; and
    descrambling data saved in the memory element by means of at least one scrambler connected to the data processing entity into plain text when data is taken from the memory element for the use of data processing elements.

2. The method according to claim 1, wherein the scrambling comprises using the at least one scrambler that is on the same semiconductor chip as the memory element connected thereto.

3. The method according to claim 1, wherein the scrambling comprises using the at least one scrambler that is in the same package as the memory element connected thereto.

4. The method according to claim 1, wherein the scrambling comprises using the at least one scrambler and the memory element connected thereto that are positioned on different printed boards.

5. The method according to claim 1, wherein the descrambling comprises using the at least one data processing element that is an application specific integrated circuit.

6. The method according to claim 1, wherein the descrambling comprises using at least one data processing element that is a processor.

7. The method according to claim 1, wherein the scrambling comprises using the at least one scrambler that is implemented by means of an interleaver and a de-interleaver.

8. The method according to claim 1, wherein the scrambling comprises using the at least one scrambler that is implemented by means of an encoder and a decoder.

9. The method according to claim 1, wherein the scrambling comprises using the at least one scrambler that is implemented by means of an encryption algorithm.

10. The method according to claim 1, wherein the scrambling comprises using the at least one scrambler that further comprises a bus adapter element.

11. The method according to claim 1, wherein the scrambler processes user data.

12. The method according to claim 1, wherein the scrambler processes commands.

13. The method according to claim 1, wherein the scrambling comprises using the at least one scrambler that further comprises a configuration register.

14. The method according to claim 1, wherein all data to be saved in the memory element is protected by means of the scrambling process.

15. The method according to claim 1, further comprising:
    protecting a predetermined part of the data to be saved in the memory element by means of the scrambling process.

16. The method according to claim 1, further comprising:
    protecting data to be saved in different areas of the memory element in different ways by means of the scrambling process.

17. The method according to claim 1, wherein scrambling comprises using the at least one scrambler that is adapted to buses in such a way that it is a transparent element from the point of view of the data processing entity.

18. An arrangement for protecting data saved in a memory, the arrangement comprising:
    at least one memory element and at least one data processing element combined by means of required interfaces into a data processing entity; and
    at least one scrambler connected to the data processing entity, and configured to scramble a form in which the data to be saved in the memory element is represented or configured to descramble data saved in the memory element into plain text when data is taken from the memory element for the use of the data processing elements, and where data to be saved in different areas of the memory element is protected in different ways and the division of the memory element is implemented by using a configuration register.

19. An arrangement for protecting data saved in a memory, the arrangement comprising:
    at least one memory element and at least one data processing element combined by means of required interfaces into a data processing entity; and
    at least one scrambler connected to the data processing entity, and configured to scramble a form in which the data to be saved in the memory element is represented and configured to descramble data saved in the memory element into plain text when data is taken from the memory element for the use of the data processing elements, and where data to be saved in different areas of the memory element is protected in different ways and the division of the memory element is implemented by using a configuration register.

20. The arrangement according to claim 19, wherein at least one data processing element is an application specific integrated circuit.

21. The arrangement according to claim 19, wherein at least one data processing element is a processor.

22. The arrangement according to claim 19, wherein the scrambler is implemented by means of an interleaver and a de-interleaver.

23. The arrangement according to claim 19, wherein the scrambler is implemented by means of an encoder and a decoder.

24. The arrangement according to claim 19, wherein the scrambler is implemented by means of an encryption algorithm.

25. The arrangement according to claim 19, wherein the scrambler comprises a bus adapter element.

26. The arrangement according to claim 19, wherein the scrambler processes user data.

27. The arrangement according to claim 19, wherein the scrambler processes commands.

28. The arrangement according to claim 19, wherein the scrambler comprises a configuration register.

29. The arrangement according to claim 19, wherein all data to be saved in the memory element is protected by means of the scrambler.

30. The arrangement according to claim 19, wherein a predetermined part of the data to be saved in the memory element is protected by means of the scrambler.

31. The arrangement according to claim 19, wherein data to be saved in different areas of the memory element is protected in different ways by means of the scrambler.

32. The arrangement according to claim 19, wherein the scrambler is adapted to buses in such a way that it is a transparent element from the point of view of the data processing entity.

33. The arrangement according to claim 19, wherein the scrambler is adapted to a bus with a compressor/decompressor.

34. An arrangement for protecting data saved in a memory, the arrangement is configured to:
  combine at least one memory element and at least one data processing element by means of required interfaces into a dato processng entity;
  scramble connected to the data processing entity, wherein the scrambler is configured to scramble a form in which the data to be saved in the memory element is represented and descramble data saved in the memory element into plain text when data is taken from the memory element for the use of the data processing elements, wherein data to be saved in different areas of the memory element is protected in different ways and the division of the memory element is implemented by using a configuration register.

35. An arrangement for protecting data saved in a memory, the arrangement comprising:
  at least one memory element and at least one data processing element combined by means of required interfaces into a data processing entity; and
  at least one scrambler means, connected to the data processing entity, for scrambling a form in which the data to be saved in the memory element is represented or for descrambling data saved in the memory element into plain text when data is taken from the memory element for the use of the data processing elements, and where data to be saved in different areas of the memory element is protected in different ways and the division of the memory element is implemented by using a configured register.

36. An arrangement for protecting data saved in a memory, the arrangement comprising:
  at least one memory element and at least one data processing element combined by means of required interfaces into a data processing entity; and
  at least one scrambler means, connected to the data processing entity, for scrambling a form in which the data to be saved in the memory element is represented and for descrambling data saved in the memory element into plain text when data is taken from the memory element means for the use of the data processing elements, and where data to be saved in different areas of the memory element is protected in different ways and the division of the memory element is implemented by using a configured register.

* * * * *